United States Patent
Pugh

(10) Patent No.: US 9,737,046 B1
(45) Date of Patent: Aug. 22, 2017

(54) ANIMAL TREADMILL AND WASTE DISPOSAL APPARATUS

(71) Applicant: Tovargii Pugh, Tacoma, WA (US)

(72) Inventor: Tovargii Pugh, Tacoma, WA (US)

( * ) Notice: Subject to any disclaimer, the term of this patent is extended or adjusted under 35 U.S.C. 154(b) by 0 days.

(21) Appl. No.: 15/422,234

(22) Filed: Feb. 1, 2017

(51) Int. Cl.
*A01K 1/01* (2006.01)
*A01K 15/02* (2006.01)

(52) U.S. Cl.
CPC .......... *A01K 1/0135* (2013.01); *A01K 15/021* (2013.01); *A01K 15/027* (2013.01)

(58) Field of Classification Search
CPC ...... A01K 1/0117; A01K 1/01; A01K 1/0107; A01K 1/011; A01K 1/0135; A01K 31/04; A01K 15/027
USPC ....... 119/479, 164, 166, 163, 165, 161, 167, 119/168, 169, 170
See application file for complete search history.

(56) References Cited

U.S. PATENT DOCUMENTS

| | | | |
|---|---|---|---|
| 3,734,057 A | 5/1973 | Lee | |
| 3,793,987 A * | 2/1974 | Rogers | A01K 13/001 119/161 |
| 3,937,182 A * | 2/1976 | Kamimura | A01K 1/0114 119/161 |
| 5,279,258 A * | 1/1994 | Kakuta | A01K 1/0117 119/163 |
| 5,592,900 A | 1/1997 | Kakuta | |
| 6,202,595 B1 * | 3/2001 | Atcravi | A01K 1/0114 119/165 |
| 6,453,844 B1 * | 9/2002 | Janzen | A01K 1/011 119/161 |
| 6,561,131 B1 * | 5/2003 | Schwartz | A01K 1/011 119/161 |
| 6,857,391 B1 * | 2/2005 | Gantt | A01K 1/011 119/163 |
| 8,464,662 B1 * | 6/2013 | Shorenstein | A01K 1/0107 119/164 |
| 8,863,693 B2 * | 10/2014 | Kennington | A01K 1/0114 119/161 |
| 2004/0065265 A1 * | 4/2004 | Manera | A01K 1/011 119/166 |
| 2007/0056521 A1 * | 3/2007 | Caputa | A01K 1/0114 119/166 |

* cited by examiner

Primary Examiner — Trinh Nguyen
(74) Attorney, Agent, or Firm — Stevenson IP, LLC

(57) ABSTRACT

An animal exercising treadmill and waste disposal apparatus including a parallelepiped platform having side walls, a front wall, a rear wall, and a hollow interior base. Each of a pair of rollers, a drive roller, a tension roller, and a plurality of support rollers is disposed between the front wall and the rear wall within the hollow interior base. A conveyor belt is connected to the first pair of rollers, the drive roller, the tension roller and the support rollers. A motor assembly rotates the rollers. Each of a removable solid waste container, a second liquid waste reservoir, and a third water reservoir is disposed within the hollow interior base below the conveyor belt. A collection plate disposed within the hollow interior base collects waste, and a pair of spray nozzles is configured to rinse the conveyor belt.

3 Claims, 5 Drawing Sheets

ANIMAL TREADMILL AND WASTE DISPOSAL APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of animal treadmills are known in the prior art. However, what has been needed is an animal treadmill and waste disposal apparatus including a parallelepiped platform with side walls, a front wall, a rear wall, and a hollow interior base. What has been further needed is a pair of front rollers rotatably attached to the front end of the interior base, a drive roller and a tension roller attached at the rear wall of the interior base, and a plurality of support rollers attached to the side walls in between. What has also been needed is an electric motor assembly located below the drive roller at the rear wall of the interior base. An endless conveyor belt is in direct contact with the first pair of rollers, the drive roller, the tension roller, and the support rollers. The rollers are rotatable by the motor assembly. A rectangular container, a waste reservoir, and a water reservoir are also needed. Lastly, what has been needed is a pair of spray nozzles to rinse animal waste from the endless conveyor belt. The animal treadmill and waste disposal apparatus thus enables a user to hygienically exercise a pet in a confined area.

FIELD OF THE INVENTION

The present invention relates to animal treadmills, and more particularly, to an animal treadmill and waste disposal apparatus that can not only eliminate fecal and urine waste, but can be used as a stationary animal walking platform.

SUMMARY OF THE INVENTION

The general purpose of the animal treadmill and waste disposal apparatus, described subsequently in greater detail, is to provide an animal treadmill and waste disposal apparatus that has many novel features that result in an animal treadmill and waste disposal apparatus that is not anticipated, rendered obvious, suggested, or even implied by prior art, either alone or in combination thereof.

To accomplish this, the animal treadmill and waste disposal apparatus includes a parallelepiped platform having a left side wall, a right side wall, a front wall, a rear wall, a rear left side corner, a rear right side corner, and a hollow interior base. A pair of first rollers rotatably attach to each of the side walls at the front wall, a drive roller and a tension roller rotatably attach to each of the side walls at the rear wall, and a plurality of support rollers with divots attach to each of the side walls between the front wall and rear wall. An electric motor assembly is located within the interior base of the parallelepiped platform underneath the drive roller at the rear wall. A belt pulley, a drive pulley and a drive belt are on the motor assembly and are affixed to the drive roll. It is envisioned that the drive pulley and drive belt may be replaced by a series of gears. An endless removeable conveyor belt in the hollow interior base of the parallelepiped platform is between, over, and in direct contact with the first pair of rollers, the drive roller, the tension roller and the support rollers. The rollers are rotatable by the motor assembly, and the endless removeable conveyor belt is moveable around the first rollers and the drive roller. Both the rollers and the endless belt sense and adjust tension in response to the weight of an animal.

A control panel disposed on the right side wall has a control switch for the motor assembly and a timer for controlling the motor assembly. A removable rectangular container with a removeable liner is disposed within the parallelepiped platform below the conveyor belt at the front wall of the hollow interior. The container is removeable from the right side wall of the parallelepiped platform. A second rectangular waste reservoir container having a removeable liner is also disposed within the parallelepiped platform below the conveyor belt between the front wall of the hollow interior and the rear wall of the hollow interior. The rectangular urine waste reservoir container is removeable from the right side wall of the parallelepiped platform. It is envisioned the waste reservoir container can be replaced with commercial aluminum plumbing, or alternatively, the waste reservoir can include custom fitted urine pads.

A third rectangular water reservoir container and electric water pump with a heating element is disposed within the parallelepiped platform below the conveyor belt proximal the rear wall. A pair of reservoir hollow pipes having a bottom end are connected to the rectangular water reservoir. A top end of each of the pair of reservoir hollow pipes is disposed on the top rear left corner and the top rear right corner of the parallelepiped platform, and each of the pair of reservoir hollow pipes has a removeable circular cap.

A rectangular collection plate is disposed within the parallelepiped platform below the endless conveyor belt and centered above the reservoir. The collection plate has a middle section, a left side, a left end, a right side, and a right end. A plurality of drainage slots are in the middle section of the collection plate. The left side of the collection plate is angled up toward the first pair of rollers, and the right side of the collection plate is angled toward the drive roller. A plurality of moveable spray nozzles are at each of the right end of the collection plate and the left end of the collection plate, and each of the plurality of spray nozzles is linked by a water hose to the water reservoir disposed below the conveyor belt at the rear wall of the parallelepiped platform. Each of the plurality of moveable spray nozzles is configured to rinse the endless removeable conveyor belt. Lastly, a rectangular trap door is fixed between the endless removeable conveyor belt and the front wall of the parallelepiped platform. The trap door is hingeably attached to the front wall and is configured to open downwards upon contact by solid waste. It is envisioned that the hingeably attached trap door can alternatively remain open when the moveable conveyor belt is in use and that an animal crate with audio and visual communication devices can be affixed to the entire apparatus in order to contain the animal.

Thus has been broadly outlined the more important features of the animal treadmill and waste disposal apparatus so that the detailed description thereof that follows may be

BRIEF DESCRIPTION OF THE DRAWINGS

Figures

DETAILED DESCRIPTION OF THE DRAWINGS

Figure 1:
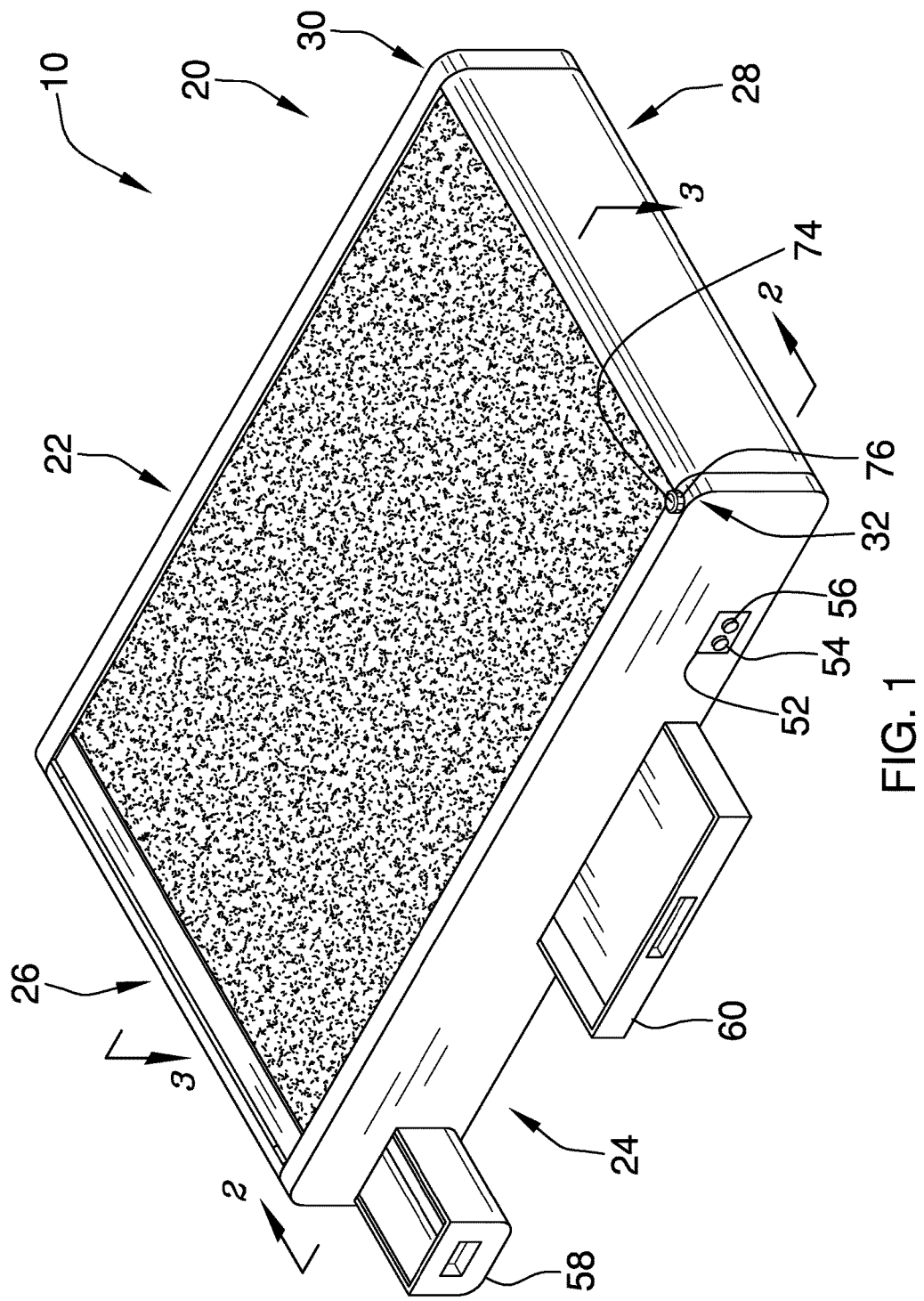
FIG. 1 is a front isometric view.
Figure 2:
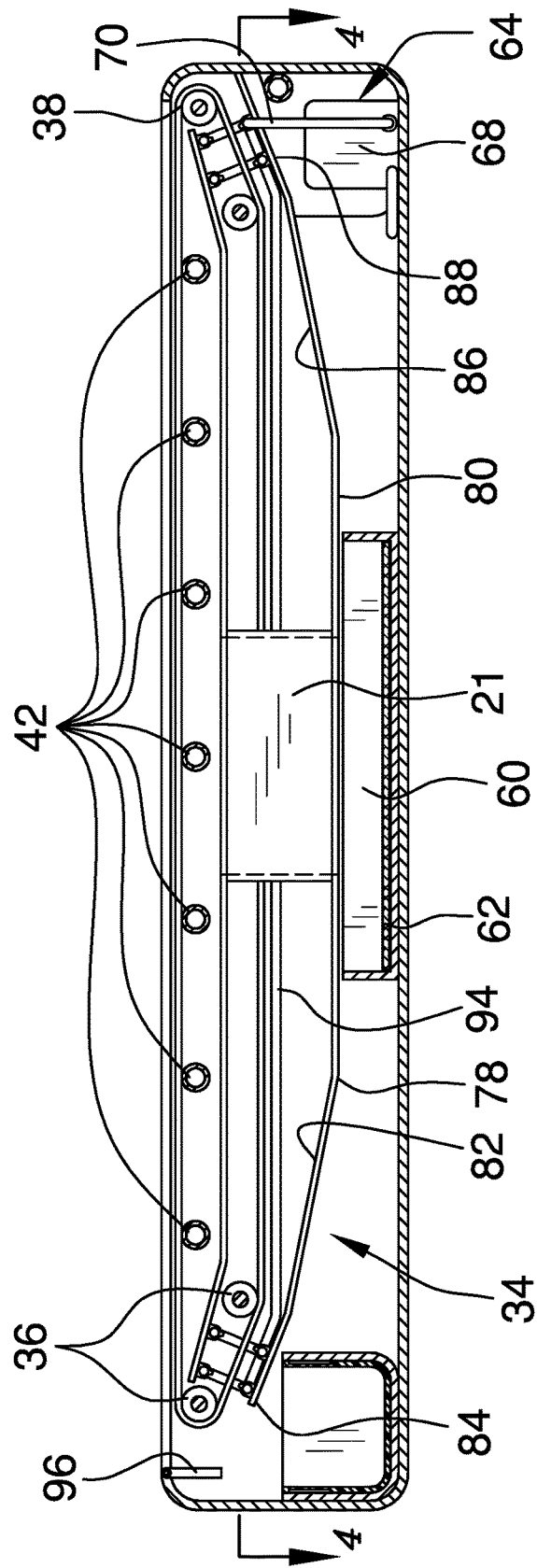
FIG. 2 is a side view showing certain components in a hollow base of the apparatus.
Figure 3:
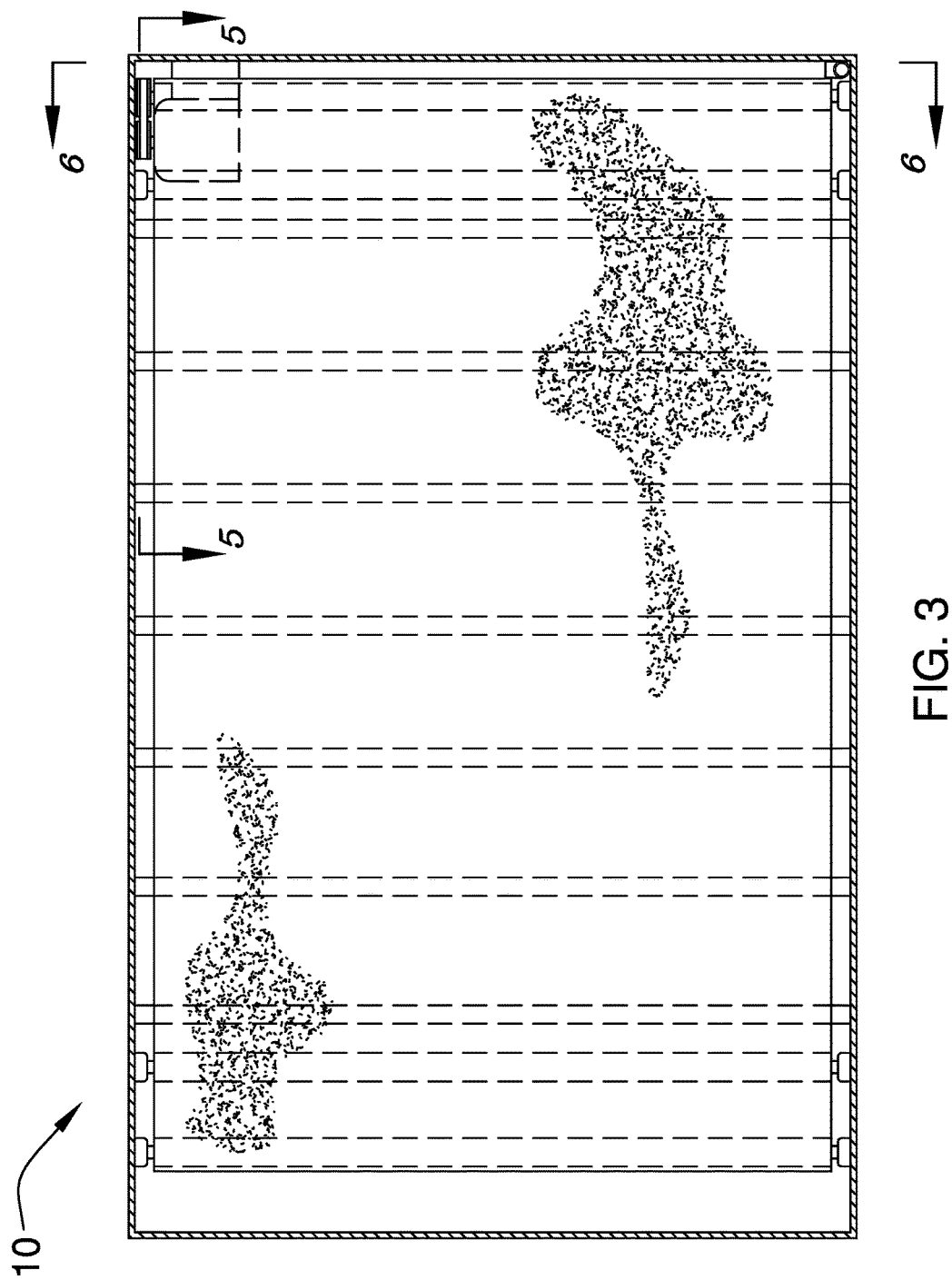
FIG. 3 is a top view.
Figure 4:
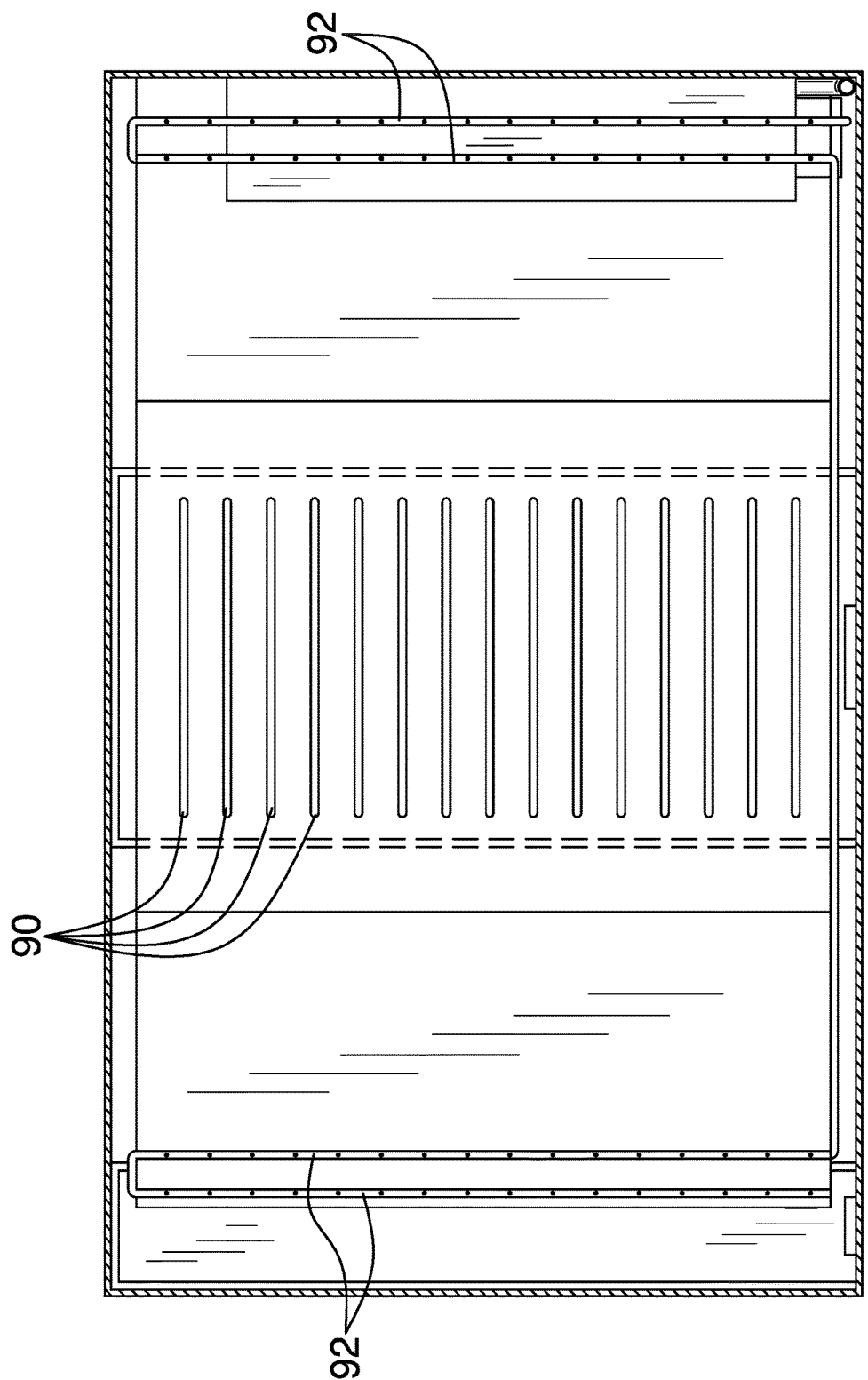
FIG. 4 is a top view showing certain components in the hollow base of the parallelepiped platform of the apparatus.
Figure 5:
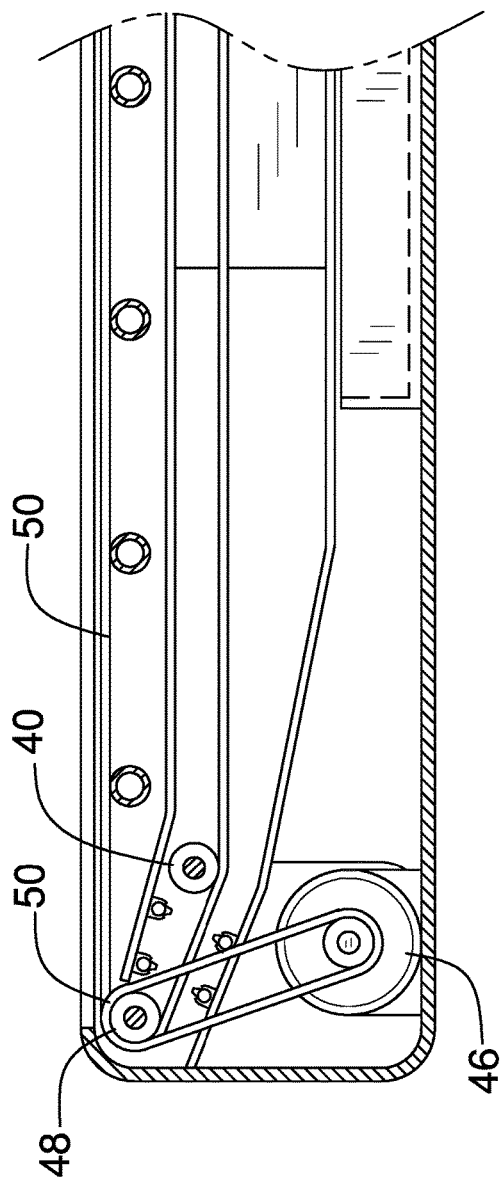
FIG. 5 is fragmentary side sectional view showing an endless conveyor belt and a belt drive apparatus of the apparatus.
Figure 6:
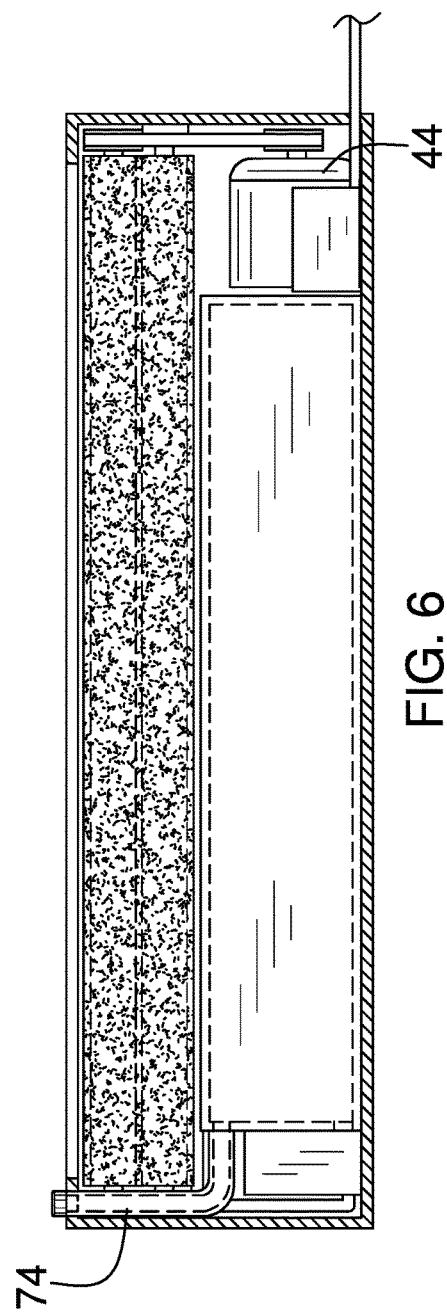
FIG. 6 is a rear view showing certain components in the hollow base of the apparatus.

With reference now to the drawings, and in particular FIGS. 1 through 6 thereof, an example of the animal exercising treadmill and waste disposal apparatus employing the principles and concepts of the present animal exercising treadmill and waste disposal apparatus and generally designated by the reference number 10 will be described.

Referring to FIGS. 1 through 6 the present animal treadmill and waste disposal apparatus 10 is illustrated. The animal treadmill and waste disposal apparatus game 10 includes a parallelepiped platform 20 with a left side wall 22, a right side wall 24, a front wall 26, a rear wall 28, a rear left side corner 30, a rear right side corner 32, and a hollow interior base 34. A pair of first rollers 36 rotatably attach to the left side wall 22 and the right side wall 24 at the front wall 26, a drive roller 38 and a tension roller 40 rotatably attach to the left side wall 22 and the right side wall 24 at the rear wall 28, and a plurality of support tension rollers having divots 42 attach to the left side wall 22 and the right side wall 24 between the front wall 26 and rear wall 28.

An electric motor assembly 44 is disposed within the interior base 36 of the parallelepiped platform 20 below the drive roller 38 at the rear wall 28 of the interior base 36. A drive pulley 46, a belt pulley 48, and a drive belt 50 are in operational communication with the motor assembly 44 and affixed to the drive roller 38. An endless removeable conveyor belt 50 is located in the hollow interior base 34 of the parallelepiped platform 20 between, over and in direct contact with the first pair of rollers 36, the drive roller 38, the tension roller 40, and the support rollers 42. The rollers are rotatable by the motor assembly 44, and the endless removeable conveyor belt 50 is moveable around the pair of first rollers 36 and the drive roller 38.

A control panel 52 is disposed the right side wall 24 and has a control switch 54 for the motor assembly 44 and a timer 56 for controlling the motor assembly 44. A removable rectangular container 58 is disposed within the parallelepiped platform 20 below the conveyor belt 50 at the front wall 26. The container 58 is removeable from the right side wall 24 of the parallelepiped platform 20. A rectangular waste reservoir container 60 with a removeable liner 62 is also disposed within the parallelepiped platform 20 below the removeable conveyor belt 50, between the front wall 26 and the rear wall 28. The rectangular waste reservoir container 60 is removeable from the right side wall 24 of the parallelepiped platform 20.

A rectangular water reservoir container 64 having an electric water pump and heating element 68 is disposed within the hollow interior base 34 below the conveyor belt 50 at the rear wall 28. A pair of reservoir hollow pipes 70 having a bottom end 72 are connected to the rectangular water reservoir 60. A top end of the pipes 74 is disposed on each of the top rear right corner 32 and top rear left corner 30 of the parallelepiped platform 20, and each reservoir hollow pipe 70 has a removeable circular cap 76.

A rectangular collection plate 78 is disposed within the hollow interior base 34 of the parallelepiped platform 20 below the endless conveyor belt 50 and centered above the waste reservoir 60. The collection plate 78 has a middle section 80, a left side 82, a left end 84, a right side 86, and a right end 88. A plurality of drainage slots 90 is disposed within the middle section 80 of the collection plate 78. The left side 82 of the collection plate 78 is angled toward the pair of first rollers 36, and the right side 86 of the collection plate 78 is angled toward the drive roller 38. A plurality of moveable spray nozzles 92 are disposed at each of the right end 88 of the collection plate 78 and the left end 82 of the collection plate 78, and each of the moveable spray nozzles 92 is linked by a water hose 94 to the water reservoir container 64. Each of the plurality of moveable spray nozzles 92 is configured to rinse the endless conveyor belt 50. Lastly, a rectangular trap door 96 is fixed between the endless conveyor belt 50 and the front wall 26 of the parallelepiped platform 20. The trap door 96 is hingeably attached to the front wall 26 and is configured to open downwards upon contact by solid waste.

What is claimed is:

1. An animal exercising treadmill and waste disposal apparatus comprising:
   a parallelepiped platform having a left side wall, a right side wall, a front wall, a rear wall, a rear left side corner, a rear right side corner, and a hollow interior base;
   a pair of first rollers rotatably attached to the side walls at the front wall of the parallelepiped platform, a drive roller and a tension roller rotatably attached to each of the left side wall and the right side wall of the parallelepiped platform, and a plurality of support tension rollers having divots attached to each of the left side wall and the right side wall between the front wall and the rear wall of the parallelepiped platform;
   an electric motor assembly disposed within the interior base below the drive roller at the rear wall of the interior base, wherein each of a belt pulley, a drive pulley and a drive belt is disposed on and in operational communication with the electric motor assembly and affixed to the drive roller;
   an endless removable conveyor belt disposed within the hollow interior base of the parallelepiped platform between, over, and in direct contact with the pair of first rollers, the drive roller, the tension roller and the plurality of support tension rollers, wherein each of the pair of first rollers, the drive roller, the tension roller, and the plurality of support tension rollers is rotatable by the motor assembly such that the endless removeable conveyor belt is moveable around each of the pair of first rollers and the drive roller;
   a control panel disposed on the right side wall, the control panel having each of a switch and a timer configured to control the electric motor assembly;
   a removable rectangular container having a removable liner, the removable rectangular container disposed within the parallelepiped platform below the endless removable conveyor belt at the front wall, wherein the removable rectangular container is removeable from the right side wall of the parallelepiped platform;

a rectangular waste reservoir container having a removeable liner, the second rectangular waste reservoir container disposed within the parallelepiped platform below the conveyor belt between the front wall and the rear wall, wherein the second rectangular waste reservoir container is removeable from the right side wall of the parallelepiped platform;

a rectangular water reservoir container and electric water pump having a electric heating element disposed within the parallelepiped platform below the conveyor belt at the rear wall;

a pair of reservoir hollow pipes, each of the pair of reservoir hollow pipes having a bottom end connected to the rectangular water reservoir container and a top end disposed on each of the top rear left corner and the top rear right corner of the parallelepiped platform, wherein each of the pair of reservoir hollow pipes has a removeable circular cap;

a rectangular collection plate disposed in the hollow interior base of the parallelepiped platform below the endless removable conveyor belt, the rectangular collection plate having a middle section, a left side, a left end, a right side, a right end, and a plurality of drainage slots disposed on the middle section of the collection rectangular plate, wherein the left side is angled toward the pair of first rollers, and the right side is angled toward the drive roller;

a plurality of moveable spray nozzles disposed at each of the right end of the collection rectangular plate and the left end of the collection rectangular plate, wherein each of the plurality of movable spray nozzles is linked by a water hose to the rectangular water reservoir container disposed below the endless removable conveyor belt at the rear wall, wherein each of the plurality of movable spray nozzles is configured to rinse the endless removable conveyor belt; and a rectangular trap door disposed along the endless removable conveyor belt and the front wall of the parallelepiped platform, wherein the rectangular trap door is hingeably attached to the front wall and configured to release upon contact from solid waste.

2. The animal exercising treadmill and waste disposal apparatus of claim 1 wherein the endless removable conveyor belt is one of a surface having a mesh rubber bottom bonded to semipermeable artificial turf.

3. The animal exercising treadmill and waste disposal apparatus of claim 1 wherein an optional animal crate is affixed to the apparatus configured to contain the animal.

* * * * *